(12) United States Patent
Arendt et al.

(10) Patent No.: US 9,169,372 B2
(45) Date of Patent: Oct. 27, 2015

(54) DIBENZOATE PLASTICIZERS/COALESCENT BLENDS FOR LOW VOC COATINGS

(75) Inventors: William D. Arendt, Libertyville, IL (US); Emily L. McBride, Kalama, WA (US)

(73) Assignee: EMERALD KALAMA CHEMICAL, LLC, Kalama, WA (US)

( * ) Notice: Subject to any disclaimer, the term of this patent is extended or adjusted under 35 U.S.C. 154(b) by 155 days.

(21) Appl. No.: 13/976,070

(22) PCT Filed: Dec. 28, 2011

(86) PCT No.: PCT/US2011/067584
§ 371 (c)(1),
(2), (4) Date: Jun. 26, 2013

(87) PCT Pub. No.: WO2012/092370
PCT Pub. Date: Jul. 5, 2012

(65) Prior Publication Data
US 2013/0274395 A1 Oct. 17, 2013

Related U.S. Application Data

(60) Provisional application No. 61/460,329, filed on Dec. 30, 2010, provisional application No. 61/460,330, filed on Dec. 30, 2010, provisional application No. 61/464,731, filed on Mar. 8, 2011.

(51) Int. Cl.
| C08K 5/06 | (2006.01) |
| C08K 5/12 | (2006.01) |
| C09D 7/12 | (2006.01) |
| C09D 11/03 | (2014.01) |
| C09J 11/06 | (2006.01) |

(Continued)

(52) U.S. Cl.
CPC .............. *C08K 5/06* (2013.01); *C08K 5/0016* (2013.01); *C08K 5/103* (2013.01); *C08K 5/12* (2013.01); *C09D 7/1233* (2013.01); *C09D 11/03* (2013.01); *C09J 11/06* (2013.01); *C08K 2201/014* (2013.01)

(58) Field of Classification Search
CPC ........................................................ C08K 5/06
USPC ........................................................ 524/290
See application file for complete search history.

(56) References Cited

U.S. PATENT DOCUMENTS

| 3,652,291 A | 3/1972 | Bedoukian |
| 5,236,987 A | 8/1993 | Arendt |

(Continued)

*Primary Examiner* — Ling Choi
*Assistant Examiner* — Lanee Reuther
(74) *Attorney, Agent, or Firm* — Hudak, Shunk & Farine Co. LPA (57) ABSTRACT

A novel, low volatility, non-phthalate plasticizer/coalescent blend for use in paints and other polymeric coatings comprises a triblend of diethylene glycol dibenzoate, dipropylene glycol dibenzoate, and 1,2-propylene glycol dibenzoate. The triblend when used in a paint or other coatings achieves a low VOC paint or coating having stable viscosity after three freeze/thaw cycles and equivalent or superior wet edge/open time ratings, gloss ratings, scrub resistance and block resistance when compared to traditional coalescents, including without limitation high VOC coalescents, low VOC non-dibenzoate coalescents and other dibenzoate blends. The triblend may be used as a substitute or alternative coalescent in latex and acrylic emulsion coatings, among others, to achieve a lower VOC content without sacrificing performance properties.

7 Claims, 7 Drawing Sheets

Vinyl Acrylic Flat and Acrylic Semigloss Scrub Resistance (51) Int. Cl.
*C08K 5/00* (2006.01)
*C08K 5/103* (2006.01)

(56) References Cited

U.S. PATENT DOCUMENTS

| | | |
|---|---|---|
| 5,676,742 A | 10/1997 | Arendt et al. |
| 5,990,214 A * | 11/1999 | Arendt et al. .................. 524/296 |
| 6,518,334 B1 | 2/2003 | Calhoun et al. |
| 7,071,252 B2 | 7/2006 | Stanhope et al. |
| 2005/0154147 A1 | 7/2005 | Germroth et al. |
| 2008/0021141 A1 | 1/2008 | Arendt et al. |
| 2008/0076861 A1 | 3/2008 | Strepka et al. |
| 2008/0103237 A1* | 5/2008 | Strepka et al. ................ 524/306 |
| 2008/0139680 A1 | 6/2008 | Arendt et al. |
| 2008/0182929 A1 | 7/2008 | Strepka et al. |
| 2009/0326121 A1 | 12/2009 | Stockl et al. |
| 2011/0218285 A1 | 9/2011 | Stockl et al. |

* cited by examiner

Figure 1. Coalescent Volatility (%)

Figure 2. Vinyl Acrylic Flat Viscosity Stability After Three Cycles of Freeze/Thaw
Note: Initial viscosity was 100 KU for each formulation; TXMB failed after three cycles of freeze/thaw.

Figure 3. Acrylic Semigloss Viscosity Stability After Three Cycles of Freeze/Thaw Figure 4. Vinyl Acrylic Flat Wet Edge/Open Time Ratings Figure 5. Acrylic Semigloss Wet Edge/Open Time Ratings Figure 6. Acrylic Copolymer Gloss Wet Edge/Open Time Ratings Figure 7. Gloss of Acrylic Semigloss Formulations Figure 8. Gloss of Acrylic Semigloss Formulations Figure 9. Gloss of Acrylic Copolymer Gloss Formulation Figure 10. Vinyl Acrylic Flat and Acrylic Semigloss Scrub Resistance Figure 11. Acrylic Copolymer Gloss Scrub Resistance Figure 12. Acrylic Semigloss Block Resistance Figure 13. Acrylic Copolymer Gloss Block Resistance

DIBENZOATE PLASTICIZERS/COALESCENT BLENDS FOR LOW VOC COATINGS

FIELD OF THE INVENTION

This invention is directed to novel film-forming aids for use in formulating paint and other coating compositions. In particular, this invention is directed to a novel dibenzoate tri-blend composition having low VOC content and improved performance characteristics over traditional plasticizer/coalescent compositions, including low VOC content plasticizer compositions, thus facilitating the use of well known emulsion systems to formulate paint and other coatings. The novel film forming aid of the invention is compatible, efficient and performs well in common emulsions including but not limited to latex paints and coatings.

BACKGROUND OF THE INVENTION

Volatile organic compounds ("VOC's") are carbon-containing compounds that readily vaporize or evaporate into the air, where they may react with other elements or compounds to produce ozone. Ozone, in turn, causes air pollution and a host of health concerns including breathing problems, headache, burning, watery eyes and nausea, just to name a few. Some VOCs have also been linked to cancer, as well as kidney and liver damage.

VOC's are of particular concern in the paint and coatings industry in the manufacture and application of products using VOC's. Use of VOC's in the manufacture of paint and coatings result in poor plant air quality and worker exposure to harmful chemicals. Persons who are exposed to VOC's may suffer from a number of health problems, including but not limited to several types of cancers, impaired brain function, renal dysfunction and other health problems.

Similarly, painters and other users of VOC-containing paints and coatings who are regularly exposed to harmful VOC vapors may suffer from health problems. VOC-containing products release harmful VOC's into the air as they dry, especially with indoor applications. Indoor VOC levels are routinely 10 times higher than outdoor levels and may be up to 1,000 times higher immediately after painting. Further, although VOC levels are highest during and soon after painting, they continue seeping out for several years. In fact, only 50 percent of the VOC's may be released in the first year.

Accordingly, regulations have been implemented to protect manufacturing workers and end-users.

Paints and coatings having high VOC content are also considered environmental hazards. They are the second largest source of VOC emissions into the atmosphere after automobiles, responsible for roughly 11 billion pounds every year.

Consumers are demanding safer alternatives, and coatings formulators continue to be faced with the challenge of reducing VOC's, while, at the same time, providing a coating with required performance characteristics. Most often, formulators reduce the amount of, or replace, the most volatile components used in the coatings, which reduces VOC concerns to some extent, but may result in compromised performance. Desirably, a low VOC content paint or coating should have, at a minimum, equivalent performance to paints or coatings having higher VOC content. Toward that end, raw material suppliers continue to develop new, lower VOC products for use in paints and coatings, which do not compromise performance.

One typically volatile, but often very necessary component, used in coating compositions is the film-forming aid, i.e., coalescent, which allows a coatings formulator to use conventional, well-recognized latex emulsions that are lower in cost. Coalescents facilitate film formation, by softening dispersed polymers and allowing them to fuse or form a continuous film. The coalescent will then partially or completely volatilize out of the film, allowing the film to regain its original physical properties such as gloss and scrub resistance. Coalescents are selected that improve the properties of the paint/coating film, such as gloss, scrub resistance, and block resistance. Coalescents are also selected based upon a variety of properties, including without limitation, volatility, miscibility, stability, compatibility, ease of use, and cost. Traditional coalescents are highly volatile and can contribute significantly to the VOC content of a paint or coating.

As an alternative for achieving lower VOC content, polymeric emulsion systems that do not require these highly volatile film-forming aids are being developed. The polymers used in these newer emulsion systems tend to be soft enough to allow a low MFFT (minimum film forming temperature); however, certain performance parameters can sometimes suffer, and these softer emulsion systems are often expensive.

Film-forming aids are known in the art. Hydrophobic film-forming aids, such as the industry standard, 2,2,4-trimethyl-1,3-pentanediol monoisobutyrate (TXMB), partition to the polymer in the emulsion and soften dispersed particles of the emulsion during the coalescing phase of the application. The coalescent then partially or completely evaporates out of the film. By its nature, this "escaping" coalescent contributes significantly to the VOC's of the film, beginning with the coalescing phase and lasting for a sustained period afterwards. This, in turn, can affect the air quality around the film and be manifested as an unpleasant odor.

Because of these issues, there has been a trend toward developing and using less volatile, more permanent film-forming aids, such as plasticizers, for the coatings industry.

Plasticizers have been known and used for years as excellent coalescents for latex paints and other coatings. In some instances, they are also desired for their plasticizer function, because softening of a harder base polymer in the coating is often desired. It is also well-known that plasticizers can improve other paint performance characteristics, such as mud cracking, wet edge and open time. Plasticizers have a greater degree of permanence than other traditional coalescents, and in some instances the permanence of plasticizers can be a detriment. For coalescents, a balance must be struck between greater permanence—and thus lower VOC's—and good final film properties.

Phthalate plasticizers, such as di-n-butyl phthalate (DBP), diisobutyl phthalate (DIBP) or butyl benzyl phthalate (BBP), have traditionally been used in the coatings industry when a true plasticizer was required, as is the case when polymers with high Tg's (glass transition temperatures) are employed in one application or another. DBP and DIBP have a lower VOC content than traditional coalescents, but are still somewhat volatile, while BBP has a very low VOC content. Apart from VOC content, however, phthalate ester use has some disadvantages, as DBP and BBP uses, in particular, are restricted due to regulatory concerns.

Dibenzoate plasticizers have been recognized for various applications since about 1938. Their utility in coatings is also well known. Dibenzoates by their nature are non-phthalates and do not have the restrictions or health concerns associated with phthalates.

Monobenzoate ester coalescent technology has been developing and evolving since the 1980's, when isodecyl benzoate (IDB) was introduced to the coatings industry as a new, lower VOC coalescent. IDB has compatibility in a wide variety of polymers and was found to be an effective, low odor coalescent in latex paint formulations as compared to the traditional use of TXMB as the coalescent.

U.S. Pat. No. 5,236,987 to Arendt discloses the use of isodecyl benzoate, decyl benzoate, isooctyl benzoate, nonylbenzoate, and dodecyl benzoate as coalescents for latex paint.

At the beginning of the twenty-first century, 2-ethylhexyl benzoate (2-EHB) was launched as a new lower VOC film forming aid. 2-EHB was found to have greater efficiency than TXMB in many formulations, as well as lower odor. Isononyl benzoate (INB) was introduced in 2009 as a coalescent with a comparable formulated evaporation rate and efficiency to 2-EHB, while exhibiting a more effective MFFT lowering behavior than IDB.

Second generation benzoate ester coalescent technology has been developed with the less volatile dibenzoate esters. Dibenzoates can satisfy reduced VOC requirements where the volatilities of monobenzoate esters are considered too high. Dibenzoate technology, traditionally, is based on dipropylene glycol dibenzoate (DPGDB) and diethylene glycol dibenzoate (DEGDB) blends. Films formulated with these blends have been found to exhibit comparable performance properties to those formulated with TXMB, with improvements in scrub resistance, chemical resistance and enhanced open times.

Dibenzoate blends along with other components for use in lower VOC aqueous polymer coating compositions and other film-forming compositions are described in the art.

U.S. Pat. Publication No. 2008/0182929 to Strepka et al. discloses lower VOC content aqueous coating compositions containing dibenzoates of diethylene and dipropylene glycols in combination with at least one of the corresponding monoesters for the primary purpose of extending the open time exhibited by aqueous polymer compositions and, in part, to replace at least a portion of more volatile organic compounds typically used as coalescents.

U.S. Pat. Publication No. 2008/0076861 to Strepka et al. discloses a film-forming composition comprising at least one acrylic or vinyl acetate polymer or copolymer as a film forming ingredient and a blend of the benzoate of a 6-carbon monohydric alcohol, diethylene glycol dibenzoate, and diethylene glycol monobenzoate for use as a floor polish.

U.S. Pat. Publication No. 2011/0218285 discloses a low VOC coating additive employing a water dispersible polymer, a water insoluble plasticizer, cyclohexanedimethanol, and optionally an amphiphilic component for coatings to improve at least one performance characteristic of the coating, such as wet edge, open time, scrub resistance, wet adhesion and water resistance. Among the plasticizers disclosed are diethylene glycol dibenzoate, dipropylene glycol dibenzoate and tripropylene glycol dibenzoate.

Still, there is a need for continued efforts to improve plasticizer/coalescent technology to achieve minimal VOC's, while improving performance properties. A newer, next generation triblend of dibenzoate esters has been developed, which functions as well as traditional plasticizers or low VOC coalescents in coating applications, while achieving unexpectedly enhanced performance benefits in gloss and scrub resistance compared to current generation low VOC coalescent technology, including some enhancements over traditional dibenzoate blends.

A novel dibenzoate triblend plasticizer for use in low VOC paints and coatings has been developed. The present invention is directed to a blend of three dibenzoate plasticizers, DEGDB, DPGDB, and 1,2-propylene glycol dibenzoate (PGDB), that allows for low VOC coalescence, while yielding unexpectedly improved properties over the traditional dibenzoate blends. The inventive triblend is an improvement upon existing dibenzoate plasticizer technology used in paints and coatings and has not been previously known or used in paint and coatings applications. The 1,2-propylene glycol dibenzoate component was previously known for its use as a plasticizer, but not in the inventive blend disclosed herein. More specifically, 1,2-propylene glycol dibenzoate was known as a flavoring agent for beverages as described in U.S. Pat. No. 3,652,291 to Bedoukian.

The inventive triblend is particularly useful in latex and acrylic coating applications and provides improved gloss, freeze/thaw stability, scrub resistance, and chemical resistance and comparable open times over traditional dibenzoate plasticizer blends. The novel triblend is compatible with a large variety of material used in paints and other coatings. The novel triblend of DPGDB, DEGDB, and PGDB has not been utilized in paints and other coatings in the past.

The focus of the present invention is on the use of the inventive blend to formulate paints and other architectural and industrial coatings; however, the invention is not limited to these applications. The inventive plasticizer triblend can be used individually and in blends with other plasticizers in applications that include but are not limited to: adhesives, caulks, OEM coatings, plastisols, sealants, over print varnishes, polishes, inks, melt compounded vinyl, polysulfides, polyurethanes, epoxies, styrenated acrylics and combinations thereof.

It is an object of the invention to provide a film-forming aid having low VOC content, efficiency and compatibility when used in traditional latex emulsions or other polymeric coatings.

It is a further object of the invention to provide a polymeric emulsion paint or coating having a low VOC content and improved performance properties, including without limitation gloss, scrub resistance and chemical resistance, over that achieved with current low VOC emulsion paints and coatings.

It is yet another object of the invention to provide a low VOC content polymer emulsion paint or coating that is cost effective to produce and that is environmentally friendly, safe to handle, and not subject to regulatory control.

SUMMARY OF THE INVENTION

Plasticizer blends of the present invention comprise unique formulations of three dibenzoate esters: diethylene glycol dibenzoate (DEGDB), dipropylene glycol dibenzoate (DPGDB), and 1,2-propylene glycol dibenzoate (PGDB). In one embodiment, the plasticizer is a novel triblend comprising from about 10 wt. % to about 90 wt. % DEGDB, from about 1 wt. % to about 50 wt. % DPGDB and from about 10 wt. % to about 90 wt. % PGDB, based upon the total weight of the blend.

The above-identified plasticizers/coalescents are compatible with each other and with various polymers used in paints and coatings, such as, for example, polyvinyl chloride and copolymers thereof, various polyurethanes and copolymers thereof; various polysulfides; various polyacrylates and copolymers thereof, various polysulfides and copolymers thereof, various epoxies and copolymers thereof, and vinyl acetate and copolymers thereof. In particular, the novel triblend of the invention is particularly compatible with latex and other polymeric emulsions used in the paint and coatings industry.

The inventive plasticizer/coalescent dibenzoate triblend has low volatility and compares favorably to the industry standard film forming aid, TXMB, and a current non-dibenzoate low VOC coalescent tri(ethylene glycol)bis-(2-ethylhexanoate) (TEGDO). In particular, the inventive dibenzoate triblend delivers equivalent and in some cases better performance benefits in gloss and scrub resistance as compared to some of the current standard and low VOC coalescent alternatives, including traditional dibenzoate blends. The inventive triblend particularly shows significant benefit in use in the more discerning acrylic copolymer gloss system, where it provides superior advantages to both scrub and block resistance. The inventive formulations provide an alternative to paint and coatings formulators to improve on the current landscape of low VOC coalescents, including traditional dibenzoate coalescents. They also provide options to use harder polymers (Tg>10° C.) in paints and coatings. The inventive triblend can also be used with softer polymers designed for low VOC coatings, as it will help the coating to form a better film.

DETAILED DESCRIPTION OF THE INVENTION

The present invention is directed to a triblend of three plasticizers: DEGDB, DPGDB, and PGDB in the ratios discussed herein. The plasticizers of the present invention can generally be utilized as a plasticizer/coalescent with numerous thermoplastic, thermoset, or elastomeric polymers and polymeric emulsions, often as a substitute or alternative for conventional plasticizer/coalescents having a higher VOC content. Any of the known polymers that can be formulated in a paint or coating can be used in combination with the novel triblend to prepare a low VOC content paint or coating in accordance with the present invention.

Useful polymers include but are not limited to various latex and vinyl polymers including vinyl acetate, vinylidene chloride, diethyl fumarate, diethyl maleate, or polyvinyl butyral; various polyurethanes and copolymers thereof; various polysulfides; cellulose nitrate; polyvinyl acetate, ethylene vinyl acetate, and copolymers thereof; and various polyacrylates and copolymers thereof.

The acrylates in particular constitute a large group of polymers of varying hardness for use with the triblend of the present invention and include without limitation various polyalkyl methacrylates, such as methyl methacrylate, ethyl methacrylate, butyl methacrylate, cyclohexyl methacrylate, or allyl methacrylate; various aromatic methacrylates, such as benzyl methacrylate; various alkyl acrylates, such as methyl acrylate, ethyl acrylate, butyl acrylate, or 2-ethylhexyl acrylate; various acrylic acids, such as methacrylic acid; vinyl acrylics; styrenated acrylics, and acrylic-epoxy hybrids.

Other polymers include without limitation epoxies, phenol-formaldehyde types; melamines; and the like.

The invention is not limited to any particular polymer. Other polymers useful in paint and coating applications will be known to one skilled in the art.

The present invention is described herein in terms of latex or other emulsions, such as acrylics, but has utility with a wide variety of polymers.

The preferred dibenzoates comprising the inventive plasticizer/coalescent triblend include DEGDB, DPGDB, and 1,2-propylene glycol dibenzoate (PGDB).

The amounts of the individual dibenzoates in the inventive triblend can vary broadly depending on the particular end use and properties desired. Thus, the amount of DEGDB can vary from about 10% to about 90% by weight based upon the total weight of the dibenzoate triblend composition, preferably greater than about 60% by weight. Higher amounts of DEGDB than either of the other two plasticizers are preferred due to cost considerations. DEGDB is far less expensive than PGDB and DEGDB. The amount of DPGDB can generally vary from about 1% to 50% by weight based upon the total weight of the triblend, preferably greater than about 15%. The amount of PGDB can vary broadly such as from 10% to about 90% by weight based upon the total weight of the dibenzoate triblend, but preferably is present in amounts of around 20 wt. %. PGDB is also lower in cost than DPGDB.

One preferred embodiment is shown below:

| a. 1,2-PGDB | 20 wt. % |
|---|---|
| b. DEGDB/DPGDB 80/20 | 80 wt. % |

The novel dibenzoate triblend of the present invention may be used as a substitute or an acceptable alternative plasticizer/coalescent for various low VOC paints and architectural and industrial coatings in exterior and interior applications, such as for example, gloss, semi-gloss and eggshell paints.

The amounts of the dibenzoate triblend used in paints and coatings may vary, depending on the composition of the particular paint or coating, the characteristics, the application or use and the results desired. As one target goal, the inventive plasticizer/coalescent triblend is used in an amount sufficient to form a film that will not crack at 40° F. Exemplary amounts may range from about 0.5 to about 1.5% per gallon of architectural paint/coating. Light industrial or other coatings may require more.

Other useful amounts are set forth in the examples. It is expected that one skilled in the art would be able to arrive at additional acceptable amounts based on the intended use and desired performance of the particular coating application. The amount of coalescent/plasticizer required is based on the MFFT of the base emulsion. The harder the polymer (higher MFFT and Tg), the more plasticizer/coalescent required. In some applications as much as 20% plasticizer or more on the basis of resin solids may be required.

The novel plasticizer/coalescent blends of the present invention provide low VOC content, viscosity stability, i.e., good freeze/thaw performance, equivalent or better wet edge/open time performance, improved gloss and unexpectedly improved scrub and block resistance. In many instances, the inventive triblend outperformed industry standard coalescents, regardless of VOC content, including traditional and newer dibenzoate blends. The inventive triblend is particularly useful as a coalescent when considering the use of harder polymers as alternatives to softer polymers for low VOC formulations.

The invention is further described by the examples set forth herein.

Experimental Methodology

Coatings Tested:

Two common architectural latex paint emulsions and one emulsion commonly used in light industrial paint applications were selected to conduct a series of tests on the inventive triblend. The vinyl acrylic emulsion (MFFT=12° C., Tg=19° C.) set forth in Table 1, below, was selected as the polymer for a flat interior formulation, and the acrylic emulsion (MFFT<12° C.) set forth in Table 2 was selected as the polymer for an interior semigloss formulation. In addition, a harder acrylic copolymer gloss emulsion (MFFT=>30° C.) set forth in Table 3 was selected in order to provide additional validation of performance. It is recognized that the hard acrylic copolymer is not intended for architectural paint applications, specifically, but is instead designed for light industrial applications. However, this emulsion was selected to explore the compatibility of the inventive triblend plasticizer/coalescent.

The test methodology selected was the same for all paint/coating formulations to allow for proper comparisons, when considering the use of harder polymers with plasticizers as alternatives to softer polymers for low VOC formulations. The use of harder polymers is an alternate path to achieve lower VOC coatings, other than use of soft polymers, and provides more options for paint formulators to consider in developing low VOC paints and coatings.

Listed below are the key parameters of the coatings:
Vinyl acrylic flat paint–Volume solids=34.8% and PVC=58%
Acrylic semigloss–Volume solids=33.7% and PVC=29.8%
Acrylic copolymer gloss–Volume solids=18% and PVC=35%.

The generic starting formulations are listed in the tables below. Other than a determination of the proper level of coalescent required, no attempt was made to optimize the formulation for any of the coalescents.

TABLE 1

Vinyl Acrylic Flat Paint Formulation

| Material Type | Amount (lbs.) |
| --- | --- |
| Water | 390 |
| Propylene glycol | 17.2 |
| Thickener | 5 |
| Microbicide | 0.5 |
| Pigment dispersant | 9 |
| Surfactant | 2 |
| Defoamer | 4 |
| Emulsifier | 2 |
| Pigment | 100 |
| Pigment | 150 |
| #1 White | 190 |
| Polymer | 254 |
| Coalescent | 6 |
| TOTAL | 1129.7 |

TABLE 2

Acrylic Semigloss Paint Formulation

| Material Type | Amount (lbs.) |
| --- | --- |
| Water | 218.7 |
| Propylene glycol | 7 |
| Ammonium Hydroxide (28%) | 1.5 |
| Pigment dispersant | 12.5 |
| Surfactant | 2.2 |
| Defoamer | 1.5 |
| Pigment | 225 |
| Extender pigment | 10 |
| Microbicide | 1.5 |
| Binder | 483.54 |
| Polymer | 43 |
| Surfactant | 1.0 |
| Rheology modifier | 17.4 |
| Rheology modifier | 4.3 |
| Coalescent | 3.5 |
| TOTAL | 1032.6 |

TABLE 3

Acrylic Copolymer Gloss Paint Formulation

| Material Type | Amount (lbs.) |
| --- | --- |
| Water | 133.5 |
| Ammonium Hydroxide (28%) | 54.0 |
| Sodium Nitrite, 15% aqueous | 9.0 |
| Dipropylene glycol methyl ether | 20.0 |
| Pigment | 205.0 |
| Pigment dispersant | 9.0 |
| Foam control agent | 1.0 |
| Surfactant | 2.0 |
| Resin (acrylic) | 577.0 |
| Rheology modifier | 1.6 |
| Rheology modifier | 2.2 |
| Coalescent | 37.9 |
| TOTAL | 1003.2 |

Plasticizer/Coalescent Components Tested:

The following plasticizers/coalescents in Table 4 were evaluated:

TABLE 4

Coalescent Abbreviations

| Abbreviation | Coalescent Name | Coalescent Manufacturer |
| --- | --- | --- |
| TXMB | 2,2,4-Trimethyl-1,3-pentanediol monoisobutyrate | Several |
| KF850S | K-FLEX ® 850S - Blend of dipropylene glycol dibenzoate and diethylene glycol dibenzoate | Emerald Kalama Chemical |
| LA705 | BENZOFLEX ® LA-705 - Competitive blend of dipropylene glycol dibenzoate and diethylene glycol dibenzoate | Several commercial manufacturers |
| KF500 | K-FLEX ® 500 - 50:50 blend of dipropylene glycol dibenzoate and diethylene glycol dibenzoate | Emerald Kalama Chemical |
| X10 | Inventive triblend of dibenzoates (Different ratio than X20) | Emerald Kalama Chemical |
| X20 | Inventive triblend of dibenzoates (4:1 DEGDB/DPGDB 80%, PDGD 20%) | Emerald Kalama Chemical |
| TEGDO | Triethylene glycol di-2-ethylhexanoate | Several commercial manufacturers |

TXMB, 2,2,4-trimethyl-1,3-pentanediol monoisobutyrate, is a very widely used product that is a standard in the industry, despite the fact that it is deemed 100% volatile by the EPA 24 ASTM D-2369 test method.

Triethylene glycol di-2-ethylhexanoate (TEGDO) is a commercial low VOC coalescent (CLVOC), which is a newer, lower VOC non-dibenzoate coalescent used as the primary Control.

Both K-FLEX 850S and BENZOFLEX LA-705 are newer, commercially available blends of two dibenzoates; K-FLEX 500 is an older, traditional blend of two dibenzoate esters.

The inventive formulations include X10 and X20, which are blends of three dibenzoate esters pursuant to the present invention, differing only in the ratios of esters used.

Methods:

Paint Preparation

Raw materials for the grind were mixed for 20 minutes in a high speed disperser. Resin was then added, and the master batch was divided into smaller batches. To each small batch was added coalescent, defoamer and additional water. Paint was then mixed for an additional 10 minutes and left to sit overnight before testing.

Oven Test.

ASTM D2369. As the invention is directed to low VOC coalescents, a first key test was the determination of the VOC of each coalescent tested. ASTM D2369, as outlined in EPA's Method 24, is the procedure of choice for determining volatiles in coatings for the purpose of calculating the volatile organic content in coatings under specified test conditions. This information is useful to the paint producer and user and to environmental interests for determining the volatiles emitted by coatings. For this example, ⅓ gram of each coalescent was placed in a weighing dish and 3 mL of toluene was added. The coalescents were heated for one hour at 110° C.±5° C. The weight percent solids content (nonvolatile matter) may be determined by difference.

Paint/Coating Testing.

The paint evaluations consisted of the following determinations:

Wet paint and film formation—pH, viscosity, KU and ICI, freeze/thaw, flow and leveling, wet edge/open time, dry to touch, spatter, low temperature film formation, touch up (RT and low temperature) and mud cracking.

Dry films—Scrub resistance, block resistance, contrast ratio, color and gloss.

Details of the test methods are listed in Table 5, below:

TABLE 5

Summary of Test Methods Employed

| Test | Reference/method |
|---|---|
| Blocking Resistance | ASTM D4946 - 3 mil wet films applied to Leneta WB chart and the films were dried for 7 days. Blocking was tested face to face at ambient and 120° F. with a 1 Kg weight in place. The samples were separated and rated. |
| Color Acceptance | Tinted paint (with 2 ounces/gallon black) drawn down at 3 mils. After one minute the paint is rubbed up in the unsealed area. The color acceptance is then rated. |
| Contrast Ratio, Reflectance, and CIE Values | ASTM D2805, E97, D2244 - 3 mil wet film over a Leneta 3B chart dried for 5 days. Contrast ratio is reflectance of black over reflectance over white. |
| Dry Adhesion | ASTM D3359B - Paint was applied to dried aged alkyd with a brush and dried for 7 days before testing by cross hatch tape adhesion. |
| Drying Time | ASTM D1640 - 3 mil wet film applied to Leneta 3B, set to touch determined at ambient. |
| Flow and Leveling | ASTM D4062 - Leneta test blade used to apply paint. Dried paint rated. |
| Freeze/Thaw | ASTM D2243 - Frozen at 0° C. and thawed at ambient. 3 cycles used. |

TABLE 5-continued

Summary of Test Methods Employed

| Test | Reference/method |
|---|---|
| Gloss and Sheen | ASTM D2243 - 3 mil wet film on Leneta 3B chart dried for five days. |
| Heat Stability | ASTM D1849 - Tested at 120° F. for two weeks. Initial and final viscosities taken. |
| ICI Viscosity | ASTM D4287 |
| Lab Rating System | 10 = Excellent, 0 = Very poor |
| Low Temperature Coalescence | Paint and equipment conditioned at 40° F. for 2 hours. Paint drawn down on a Leneta Form HK to 6 mils wet. The films were dried horizontal for 24 hours and rated (see lab rating system below). |
| Mudcracking | Paint was applied with a Leneta Antisag meter (14-60 mils) on an HK chart at ambient and 40° F. After 24 hour dry the greatest mils without cracking noted. |
| pH | ASTM E70 |
| Roller Splatter | ASTM D4707 - Black catch panel placed under an Upsom panel from the touch up test. After applying the test panel was evaluated via D4707. |
| Scrubbability | ASTM D2486 - Paint applied at 7 mils wet to a Leneta P121-10N chart and dried at room temperature for 7 days. A 10 shim was employed with abrasive media (SC-2). Failure was a continuous thin line at the shim. |
| Stormer Viscosity | ASTM D562 |
| Touch Up | Touch up was tested with the paint prepared for the color acceptance. Self-primed Upsom was used and applied with a Linzer 2" Bristle and polyester brush at RT and 40° F. and allowed to dry overnight. The test paint was applied and rated for sheen uniformity and color difference. |
| Wet Edge/ Open Time | Paint applied with notched drawdown bar on Leneta WB chart. At 1 minute intervals ¼ of 1" brush was dipped into the paint and brushed 10 strokes across the line. The wet edge was rated with the lab system. |

EXAMPLE 1

Plasticizer/Coalescent Volatility

Although the amount of coalescent used in a gallon of paint is not enormous, minimizing every component contributing to VOC content is essential. Even a raw material generally used at a relativity low level can be altered to reduce VOC significantly. Oven tests are a standard method to compare VOC contribution of volatile and semi-volatile components. Oven tests as described above were conducted on the plasticizers/coalescents listed in Table 4 and DIBP, BBP, and DBP.

Figure 1:
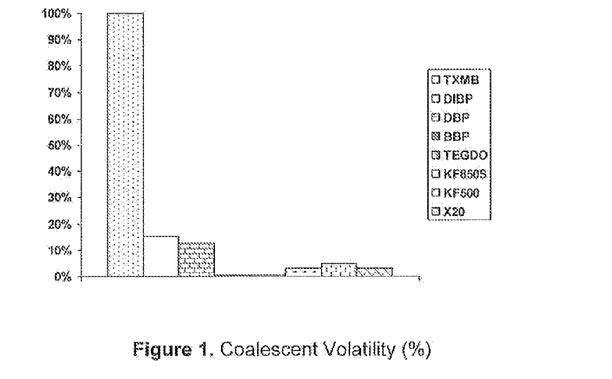
FIG. 1 is a chart reflecting volatility of both non-dibenzoate and dibenzoate plasticizers and coalescents.

FIG. 1 illustrates the volatility of the coalescents based upon the results determined by the oven test. As seen in FIG. 1, the inventive formulation X20 had a comparable low volatility when compared to the blends of two dibenzoates (K-FLEX 850S (newer) and K-FLEX 500 (traditional), although the values for K-FLEX 500 were slightly higher. X20 also had a favorable volatility profile when compared to the newer, non-dibenzoate low VOC coalescent used as the primary control (TEGDO). Values obtained for X10 were substantially the same as for X20, but are not shown in FIG. 1. Values for BENZOFLEX LA-705 were comparable to K-FLEX 500 and also are not shown in FIG. 1. Overall, K-FLEX 850S, X10 and X20 yielded the same low volatility values.

FIG. 1 establishes that all of the low VOC coalescents were found to be very low in volatility compared to TXMB, the industry standard, and, as such, were considered to be acceptable low VOC alternatives. Of the non-dibenzoate plasticizers, DIBP is the most volatile. The rest of the low VOC plasticizer coalescents would contribute very little to the VOC of a coating, especially at the low levels of use.

EXAMPLE 2

Coalescent Efficiency

Prior to initiating the paint evaluation, the efficiency of each coalescent was determined in the base paint formulations described in Tables 1, 2 and 3 above. Determination of the efficiency of a coalescent is often done on the binary pair and determining the MFFT of the blend of coalescent and base emulsion. In this case, each coalescent's efficiency level was established by determining the amount of coalescent (in lbs.) required to obtain proper film formation at 40° F. (4° C.) in each of the paints/coatings described above. For this test, TXMB was used as the primary control for efficiency, since it is still considered a benchmark in this type of study. For the low VOC coalescents, the best comparison is TEGDO, a commercially available low VOC coalescent.

For 100 gallons, the flat paint required 6 pounds, the semigloss 3.5 pounds, and the glossy paint 38 pounds (in addition to the propylene glycol methyl ether present) of each coalescent for proper coalescence (film formation). It was determined that each coalescent had equivalent efficiency based upon this test.

EXAMPLE 3

Wet and Drying Film Characteristics

Tables 6 through 8 reflect the performance data obtained for the wet paint or the dried paint using various coalescents as described above. As seen in the tables, the performance was similar for each paint, in all cases, including pH, initial viscosity (Stormer and ICI), heat stability, flow and leveling, mud cracking (flat only, RT and low temperature), touch up (RT and low temperature), color acceptance, spatter resistance, and low temperature film formation (over sealed and unsealed substrate). Most of these parameters are considered very important as the coalescent choice has the potential to detract from performance in all of these areas. For the harder acrylic copolymer gloss formulation (Table 8), data is only provided for KF850S, X20 and TEGDO.

TABLE 6

Wet and Drying Paint Data for Acrylic Semigloss Formulation

| Coalescent | TXMB | KF850S | LA705 | KF500 | X10 | X20 | TEGDO |
|---|---|---|---|---|---|---|---|
| Viscosity, ICI | 0.9 | 0.9 | 0.9 | 0.9 | 0.9 | 0.9 | 0.9 |
| Viscosity, KU | 108 | 108 | 108 | 109 | 109 | 109 | 110 |
| Heat Stability, 2 Weeks at 120° F. | | | | | | | |
| Viscosity, KU | 109 | 109 | 108 | 109 | 111 | 109 | 111 |
| Difference | 1 | 1 | 0 | 0 | 2 | 0 | 1 |
| Low Temperature Film Formation, 6 Mils | | | | | | | |
| Sealed | 10 | 10 | 10 | 10 | 10 | 10 | 10 |
| Unsealed | 10 | 10 | 10 | 10 | 10 | 10 | 10 |
| Reflectance | 94.2 | 94.3 | 94.4 | 94.3 | 94.2 | 94.3 | 94.36 |
| Contrast Ratio, 3 Mils | 0.981 | 0.981 | 0.980 | 0.984 | 0.981 | 0.981 | 0.980 |

TABLE 7

Wet and Drying Paint Data for Vinyl Acrylic Flat Formulation

| Coalescent | TXMB | KF850S | LA705 | KF500 | X10 | X20 | TEGDO |
|---|---|---|---|---|---|---|---|
| Viscosity, ICI | 0.6 | 0.8 | 0.8 | 0.8 | 0.8 | 0.7 | 0.8 |
| Viscosity, KU | 100 | 100 | 100 | 100 | 100 | 100 | 100 |
| Heat Stability, 2 Weeks at 120° F. | | | | | | | |
| Viscosity, KU | 98 | 97 | 98 | 97 | 98 | 97 | 98 |
| Difference | −2 | −3 | −2 | −3 | −2 | −3 | −2 |
| Spatter Resistance | 4 | 4 | 4 | 4 | 4 | 4 | 4 |
| Low Temperature Film Formation, 6 Mils | | | | | | | |
| Sealed | 10 | 10 | 10 | 10 | 10 | 10 | 10 |
| Unsealed | 10 | 10 | 10 | 10 | 10 | 10 | 10 |
| Mudcracking | | | | | | | |
| Room Temperature, Mils with no cracking | 40 | 40 | 40 | 40 | 40 | 40 | 40 |
| Cold Temperature (40 F.), Mils with no cracking | 16 | 16 | 16 | 16 | 16 | 16 | 16 |
| Touch Up | | | | | | | |
| Room Temperature | 8 | 8 | 8 | 8 | 8 | 8 | 8 |
| Cold Temperature (40 F.) | 6 | 6 | 6 | 6 | 6 | 6 | 6 |
| Color Acceptance | 10 | 10 | 10 | 10 | 10 | 10 | 10 |
| Reflectance | 90.6 | 90.6 | 90.5 | 90.5 | 90.6 | 90.5 | 90.5 |
| Contrast Ratio, 3 Mils | 0.953 | 0.960 | 0.958 | 0.959 | 0.954 | 0.958 | 0.960 |

TABLE 8

Wet and Drying Paint Data for Acrylic Copolymer Gloss Formulation

| Coalescent | KF850S | X20 | (TEGDO) |
|---|---|---|---|
| Viscosity, ICI, Poise, 25° C. | 0.5 | 0.4 | 0.4 |
| Stormer Viscosity, KU, 25° C. | 106 | 107 | 113 |
| Heat Stability, 2 Weeks at 120° F. | | | |
| Viscosity, KU | 102 | 103 | 108 |
| Difference | −4 | −4 | −5 |
| Low Temperature Film Formation, 6 mils | | | |
| Sealed | 10 | 10 | 10 |
| Unsealed | 10 | 10 | 10 |
| Reflectance | 93.9 | 93.8 | 94.0 |
| Contrast Ratio, 3 Mils | 0.986 | 0.985 | 0.986 |

EXAMPLE 4

Freeze/Thaw Resistance

Figure 2:
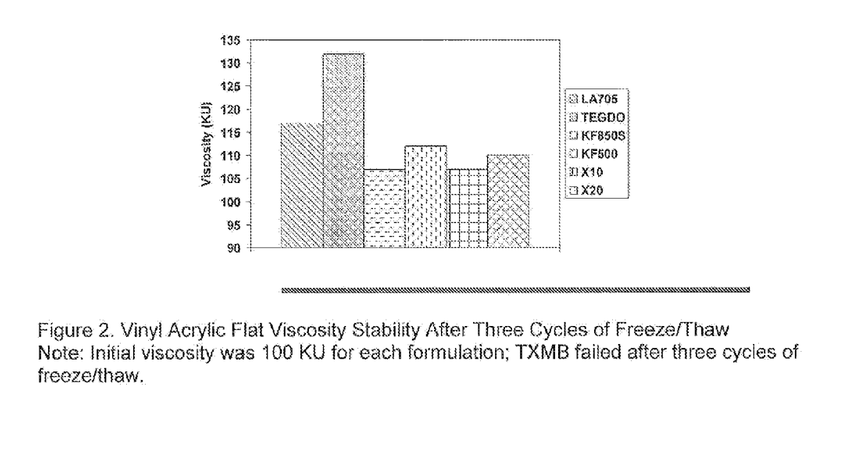
FIG. 2 is a chart reflecting viscosity stability of acrylic flat paint after three freeze/thaw cycles for various low VOC coalescents.
Figure 3:
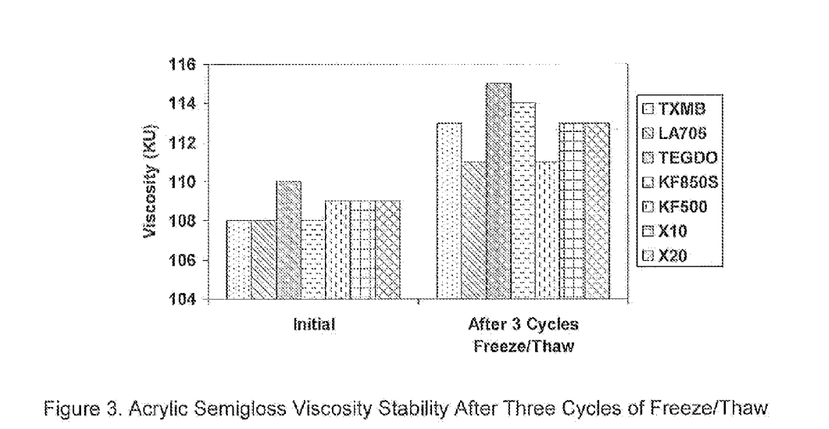
FIG. 3 is a chart reflecting viscosity stability of acrylic semigloss paint after three freeze/thaw cycles for various coalescents.

One paint property that can suffer in lower VOC content paints or coatings is freeze/thaw resistance. FIGS. 2 and 3 illustrate the results obtained for three cycles of freeze/thaw on the vinyl acrylic flat and acrylic semigloss paints. The flat paints with dibenzoate coalescents had better freeze/thaw characteristics than those with the new low VOC content TEGDO coalescent. For the semigloss formulation, all of the paints using dibenzoate coalescents were superior to the TEGDO control, but similar to the TXMB alcohol ester control. In the acrylic copolymer gloss formulation, all of the evaluated systems failed after three cycles of freeze/thaw. Based on these results, the inventive triblend offers some advantages in flat and semigloss formulations.

EXAMPLE 5

Wet Edge/Open Time

Figure 4:
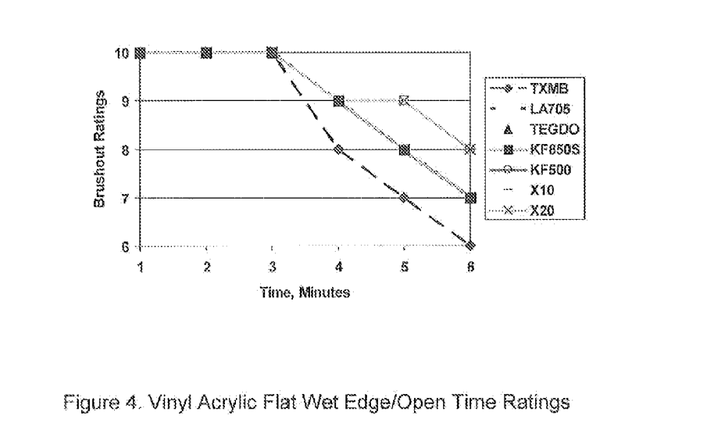
FIG. 4 is a chart reflecting wet edge/open time ratings of a vinyl acrylic flat paint for various coalescents.
Figure 5:
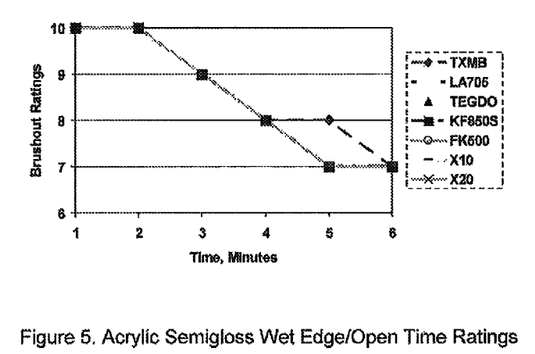
FIG. 5 is a chart reflecting wet edge/open time ratings of an acrylic semigloss paint for various coalescents.
Figure 6:
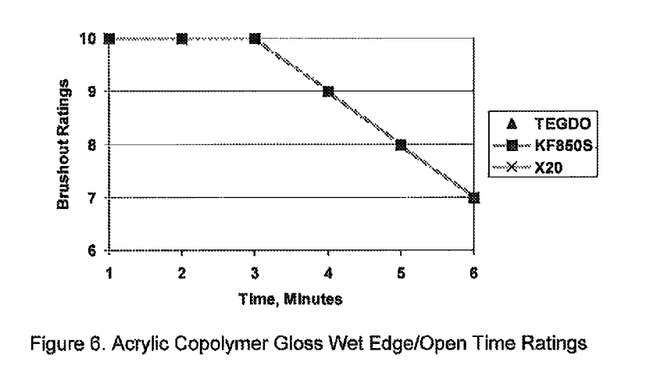
FIG. 6 is a chart reflecting wet edge/open time ratings of an acrylic copolymer gloss pain for various low VOC coalescents.

The coalescent type can affect wet edge/open time of paint. It is known that plasticizers will extend wet edge better than volatile coalescents. FIGS. 4, 5 and 6 present the data obtained to describe this characteristic for the plasticizer/coalescents described herein. The test used to consider wet edge or open time for the formulations evaluated is set forth in Table 5 and was somewhat different than other current tests being considered, such as the one that the ASTM D01 committee is considering to describe this paint attribute.

The data obtained indicated that all of the low VOC coalescent paints have a somewhat longer wet edge than the high VOC coalescent (TXMB) in the flat paint; however, the inventive triblend formulation X20 outperformed both TEGDO and the dibenzoate control KF850S in the flat paint. In the acrylic semigloss paint and the acrylic copolymer gloss coating systems, the wet edge characteristics for all low VOC coalescents appeared to be equivalent.

EXAMPLE 6

Dry Film Characteristics

Figure 7:
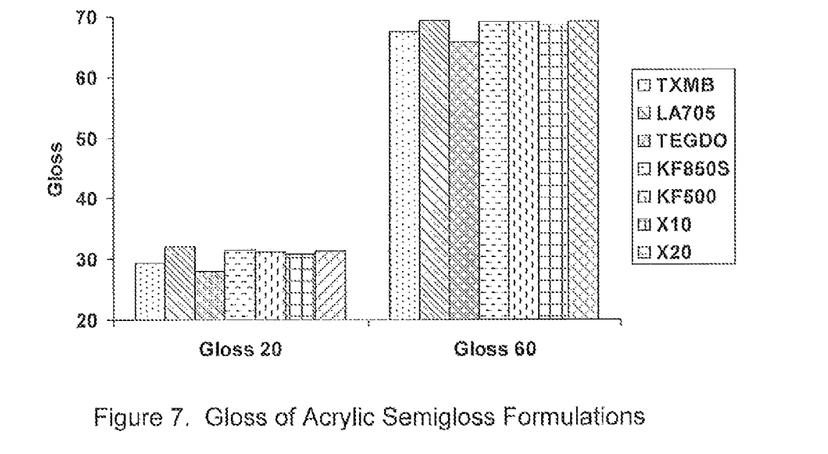
FIG. 7 is a chart reflecting gloss ratings for an acrylic semigloss paint for various coalescents.
Figure 8:
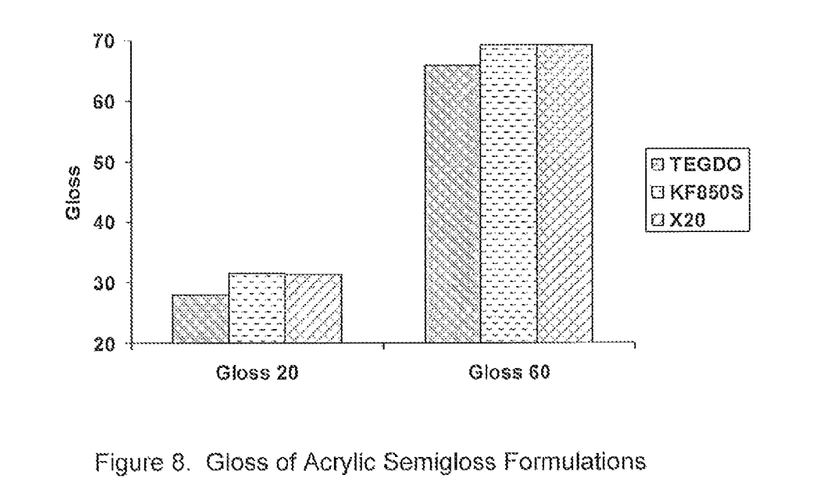
FIG. 8 is a chart reflecting gloss ratings for an acrylic semigloss paint for various low VOC coalescents.
Figure 9:
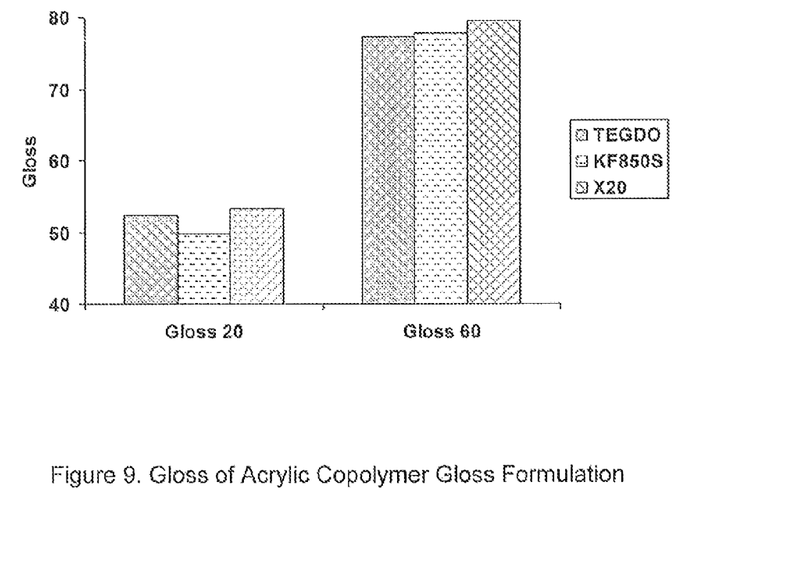
FIG. 9 is a chart reflecting gloss ratings for an acrylic copolymer gloss paint for various low VOC coalescents.

Gloss is a good indicator of the quality of film formation of a coating. The data shown in FIG. 7 indicates that, with the exception of TEGDO, all of the low VOC coalescents had somewhat higher gloss in the semigloss formulation as compared to TXMB. In the case of TEGDO, its gloss was lower than the other low VOC dibenzoate coalescents and TXMB coalescent. FIG. 8 shows results for the semigloss formulation, comparing only the KF850S (control), X20 (inventive triblend) and TEGDO coalescents. The data indicates that the low VOC dibenzoate coalescents KF850S (control) and X20 (inventive triblend formulation) yielded somewhat higher gloss in the semigloss formulation than TEGDO. In the acrylic copolymer gloss system, the X20 dibenzoate blend gave slightly higher gloss than TEGDO as shown in FIG. 9.

EXAMPLE 7

Scrub Resistance

Figure 10:
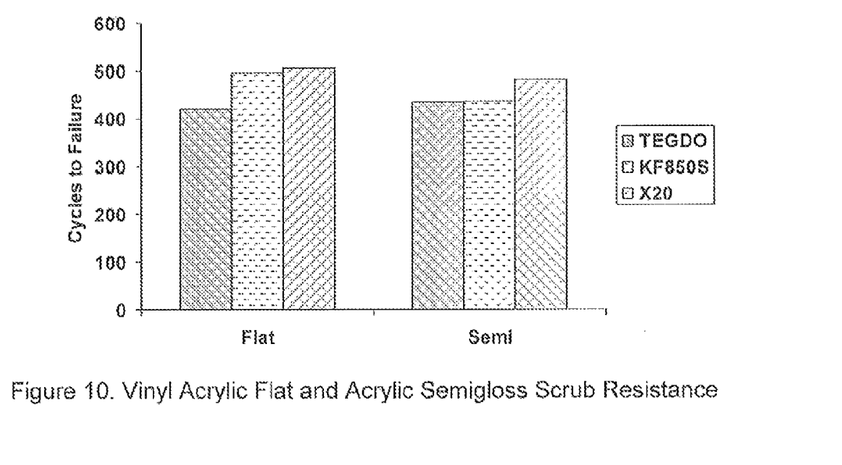
FIG. 10 is a chart reflecting scrub resistance of a vinyl acrylic flat paint and an acrylic semigloss paint for various low VOC coalescents.

The job of a coalescent in a latex (or any) coating composition—whether it is a highly volatile organic compound or a true plasticizer for the polymer—is to assist in the process of film formation, particularly at low temperatures. The coalescent should also have a minimal impact on the coating's performance after the film is dry. One may assume that, due to their relative permanence, plasticizers may diminish film properties, such as scrub; however, this is not necessarily so. FIG. 10 illustrates that the dibenzoates tested had slightly better scrub resistance than the coatings formulated with TEGDO in the flat paint. KF850S and TEGDO have similar scrub resistance in semigloss paints, and the inventive triblend X20 outperformed both of these low VOC coalescents in semigloss paint.

Figure 11:
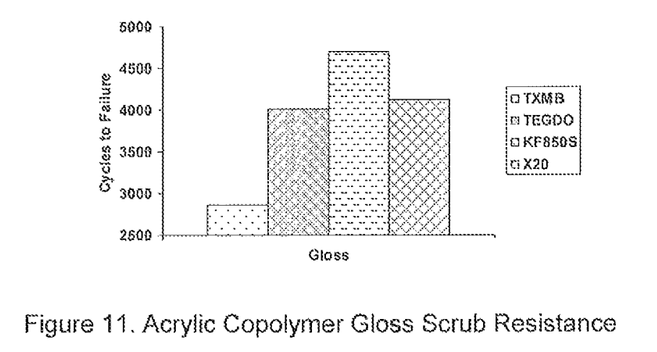
FIG. 11 is a chart reflecting scrub resistance of an acrylic copolymer gloss paint for various coalescents.

In FIG. 11, the low VOC coalescents' improvement of scrub resistance over. TXMB is unexpectedly and significantly improved in the acrylic copolymer gloss formulation, with the KF850S dibenzoate system showing an additional improvement over TEGDO. This indicates that the inventive triblend is useful for formulating low VOC content paints and coatings containing harder polymers, while still achieving excellent scrub resistance.

EXAMPLE 8

Block Resistance

Figure 12:
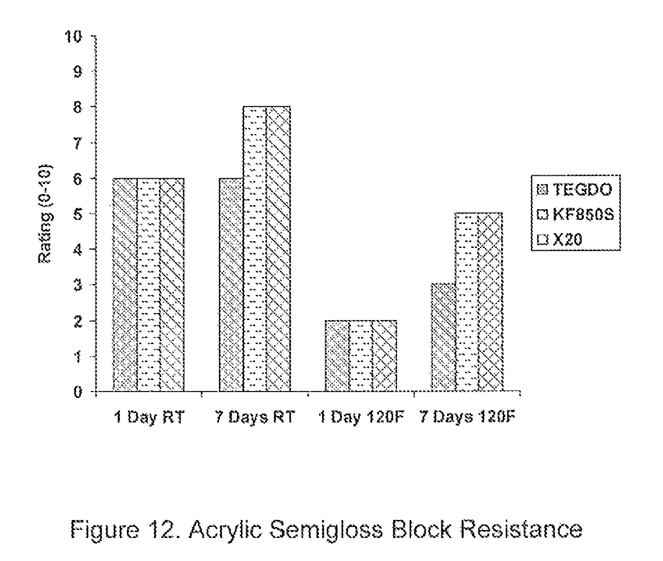
FIG. 12 is a chart reflecting block resistance of an acrylic semigloss paint for various low VOC coalescents.

Another indicator of film performance with plasticizers is block resistance. FIG. 12 illustrates the block resistance data obtained for semigloss paints containing low VOC coalescents. Notably, the low VOC benzoate plasticizers outperformed TEGDO on both room temperature and elevated temperature seven day blocking tests. As stated above, there was no attempt to modify formulations to optimize performance. Instead, this study demonstrated the feasibility of using the new generation plasticizer/coalescent triblend platform as a substitute or alternative for low VOC film forming aids, including other dibenzoate blends.

Figure 13:
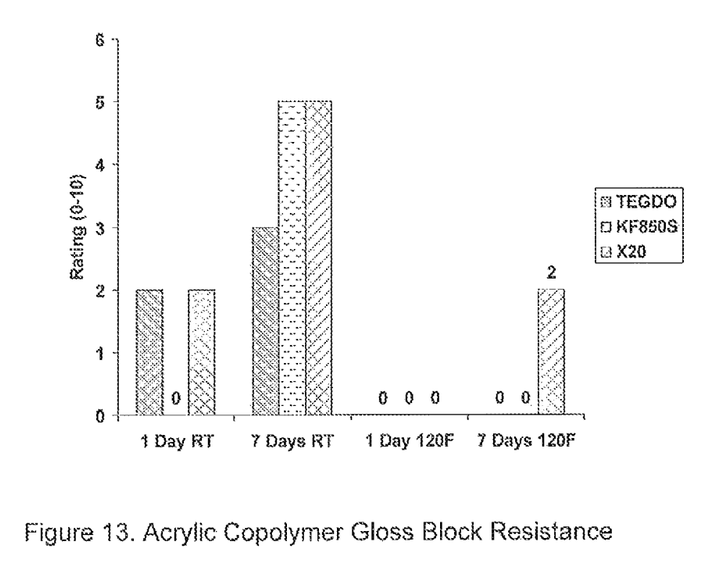
FIG. 13 is a chart reflecting block resistance of an acrylic copolymer gloss paint for various low VOC coalescents.

In FIG. 13, the acrylic copolymer gloss system formulated with the inventive formulation X20 showed a distinct block resistance advantage at elevated temperatures over bath TEGDO and the dibenzoate control KF850S after seven days of exposure, as well as an advantage over TEGDO after seven days at room temperature.

The data set forth above indicated that the inventive dibenzoate triblend functions well as both a plasticizer and a low VOC coalescent for coatings applications. In addition, the testing indicated that the new dibenzoate triblend delivers superior performance benefits in gloss and scrub resistance as compared to some of the current standard and low VOC coalescent choices. X20 particularly shows significant benefit in use in the more discerning acrylic copolymer gloss system, where it provides advantages to both scrub and block resistance. The inventive formulations provide an alternative to paint and coatings formulators to improve on the current landscape of low VOC coalescents, including traditional dibenzoate coalescents.

In accordance with the patent statutes, the best mode and preferred embodiments have been set forth, the scope of the invention is not limited thereto, but rather by the scope of the attached claims.

What is claimed is:

1. A low VOC coalescent triblend additive for use in a polymeric coating composition, consisting essentially of:
   a. diethylene glycol dibenzoate present in amounts of at least about 60 wt. %,
   b. dipropylene glycol dibenzoate present in amounts of at least about 15 wt. %, and
   c. 1,2-propylene glycol dibenzoate present in amounts of at least about 20 wt. %,
   based upon the total weight of the triblend composition.

2. The triblend additive of claim 1, wherein the blend comprises 80 wt. % of a mixture of diethylene glycol dibenzoate (DEGDB) and dipropylene glycol dibenzoate (DPGDB), wherein the ratio of DEGDB to DPGDB is about 4:1, and 20 wt. % of 1,2-propylene glycol dibenzoate, based upon the total weight of the plasticizer triblend additive.

3. A low VOC coating composition, comprising:
   a. an aqueous polymeric emulsion; and
   b. a non-phthalate, low VOC coalescent consisting essentially of a triblend of diethylene glycol dibenzoate, dipropylene glycol dibenzoate, and 1,2-propylene glycol dibenzoate,
   wherein the coalescent achieves equivalent or better wet edge/open time and gloss ratings, equivalent or better scrub resistance and block resistance over traditional low VOC coalescents, and
   wherein the viscosity of the coating composition remains stable after three freeze/thaw cycles.

4. The low VOC coating composition of claim 3,
   wherein the diethylene glycol dibenzoate is present in an amount greater than about 60 wt. %;
   wherein the dipropylene glycol dibenzoate is present in an amount greater than about 15 wt %; and
   wherein the 1,2-propylene glycol dibenzoate is present in an amount greater than about 20 wt %,
   based upon the total weight of the triblend.

5. The low VOC coating composition of claim 3,
   wherein the aqueous polymeric emulsion is a latex, vinyl acrylic, acrylic semi-gloss or an acrylic copolymer gloss emulsion.

6. The low VOC coating composition of claim 3,
   wherein the aqueous polymeric emulsion comprises vinyl acetate, polyvinyl acetate, ethylene vinyl acetate, and copolymers thereof; vinylidene chloride; diethyl fumarate; diethyl maleate; polyvinyl butyral; polyurethanes and copolymers thereof; polysulfides; cellulose nitrate; polyalkyl methacrylates, such as methyl methacrylate, ethyl methacrylate, butyl methacrylate, cyclohexyl methacrylate, or allyl methacrylate; various aromatic methacrylates, such as benzyl methacrylate; various alkyl acrylates, such as methyl acrylate, ethyl acrylate, butyl acrylate, or 2-ethylhexyl acrylate; various acrylic acids, such as methacrylic acid; vinyl acrylics; styrenated acrylics; acrylic-epoxy hybrids; epoxies, phenol-formaldehyde polymers; melamines; or mixtures thereof.

7. A low VOC coating composition, comprising:
   a. a polymeric emulsion comprising latex, a vinyl acrylic or an acrylic copolymer; and
   b. a non-phthalate coalescent triblend consisting essentially of:
      i. 80 wt. % of a mixture of diethylene glycol dibenzoate and dipropylene glycol dibenzoate, wherein the ratio of DEGDB to DPGDB is about 4:1; and
      ii. 20 wt. % of 1,2-propylene glycol dibenzoate,
   based upon the total weight of the triblend.

* * * * *